A. J. SLONECKER.
VARIABLE SPEED TRANSMISSION GEARING.
APPLICATION FILED APR. 12, 1909.
950,010.
Patented Feb. 22, 1910.
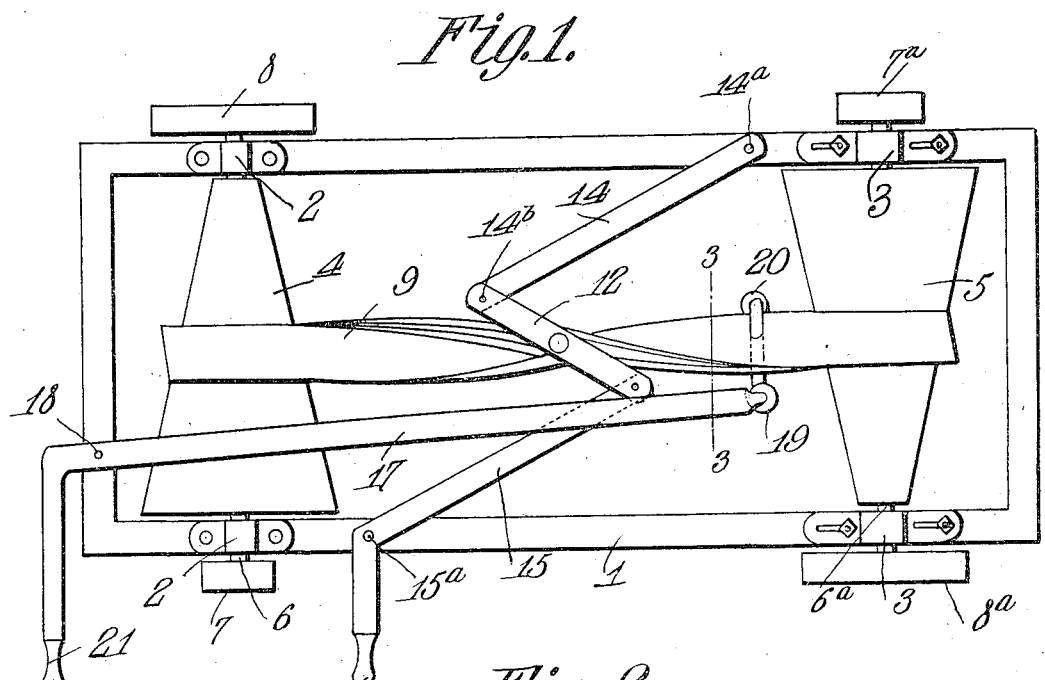
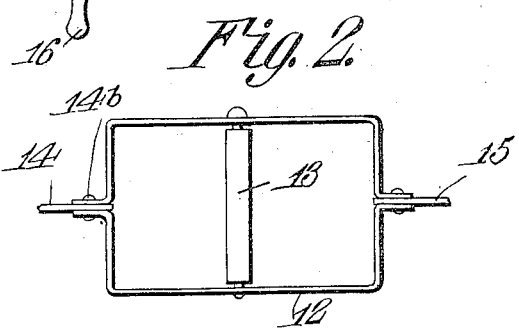
Inventor
Abiram J. Slonecker.
Witnesses
By C.A. Snow & Co.
Attorneys

UNITED STATES PATENT OFFICE.

ABIRAM J. SLONECKER, OF TRENTON, MISSOURI.

VARIABLE-SPEED TRANSMISSION-GEARING.

950,010.　　　　　Specification of Letters Patent.　　Patented Feb. 22, 1910.

Application filed April 12, 1909. Serial No. 489,406.

*To all whom it may concern:*

Be it known that I, ABIRAM J. SLONECKER, a citizen of the United States, residing at Trenton, in the county of Grundy and State of Missouri, have invented a new and useful Variable-Speed Transmission-Gearing, of which the following is a specification.

This invention is designed to provide a simple and efficient gearing for the transmission of power at different rates of speed, and which will permit a change of speed slowly and by degrees while the power is being transmitted, and without stopping the motive power, or slowing down the same, and without subjecting the mechanism, machine, motive power or work to any undue strain or injury.

The invention also has for its object to provide a mechanism of the kind stated which is capable of producing a great variety of speeds, and which is simple and compact in form, and easily controlled.

Another object of the invention is to provide a transmission gearing suitable for use on automobiles, which will permit of gradually changing from one speed to another while the automobile is being driven under full power, without danger of injury to the gearing or engines.

The invention also has for its object to provide improved means by which a belt connecting two cone pulleys may be shifted to the smaller end of one of said pulleys, and thus loosened to such an extent that no motion will be transmitted.

With the foregoing objects in view, the invention consists in a novel construction and arrangement of parts to be hereinafter described and claimed, reference being had to the drawing hereto annexed forming a part of this specification, in which drawing—

Figure 1 is a plan view. Fig. 2 is an elevation of the belt shifter carriage. Fig. 3 is a section on the line 3—3 of Fig. 1. Fig. 4 is a sectional detail of the belt.

Referring more particularly to the drawing, 1 denotes a solidly built framework supporting two sets of bearings 2 and 3 for carrying the rotating parts. In the bearing 2 is journaled the bearing shaft 6 of a cone pulley 4, and in the bearings 3 is journaled the bearing shaft $6^a$ of a cone pulley 5. The axis of the cone pulleys are parallel to each other, and their apexes point in opposite directions. The shaft 6 carries a small drive pulley 7, and a large drive pulley 8, either one of which may be employed to transmit power to the work. On the shaft $6^a$ is mounted a small pulley $7^a$, and a large pulley $8^a$. The pulley $7^a$ is in line with the pulley 8, and the pulley $8^a$ is in line with the pulley 7. The cone pulleys 4 and 5 are connected, and one is driven by the other by means of an endless belt 9 which is crossed between said pulleys. This belt is tapered in cross section, that is, one edge is thick, and the belt gradually tapers to an opposite thin edge. The object of thus shaping the belt is that it may snugly fit the cone pulleys, and operate without slipping on the tapering surfaces thereof. The planes of each side of the belt diverge at the same angle as that of the taper of the surface of the cone pulleys.

At 12 is indicated a belt shifter carriage which is hung directly between the cone pulleys, and carries a rotating pin or roller 13, which works between the two runs of the belt 9 at the crossing, and serves to prevent the two opposite faces of the belt from coming in contact with each other, whereby said faces are effectually prevented from wearing against each other. The belt shifter carriage 12 is an open frame to permit the passage of the belt therethrough, and it also serves as a means for shifting the belt along the cone pulleys, and thus changing the speed. The carriage 12 is supported at one end by a link 14 pivotally connected at one end as indicated at $14^a$ to the frame 1, and at the other end to the carriage as indicated at $14^b$. To the opposite end of the carriage is pivotally connected a lever 15 which is fulcrumed at $15^a$ on the frame 1 and is provided with a handle 16 by which the carriage is shifted.

At 17 is indicated a lever fulcrumed at 18 on the frame 1, and extending to a point near the cone pulley 5, its free end carrying idler rollers 19 and 20, between which the belt 9 travels, and adapted to engage the opposite edges of the latter. The lever 17 is provided with a handle 21, by means of which it is operated, and its free end is made to throw the belt from the larger to the smaller diameter of the pulley 4. The roller 19 extends perpendicular to and is engageable with the wide edge of the belt. The periphery of the roller 20 is grooved to receive the thin edge of the belt, and this roller is also slightly inclined from the perpendicular in order to make a better contact with the belt. The bearings 3 are adjustably mounted on the frame-work 1 for the purpose of taking up slack or stretch in the belt 9, said bearings having slots through which pass the fastening means whereby they are secured to the frame-work.

In the operation of the gearing, the power from the prime mover is transmitted to either pulley 7$^a$ or 8$^a$, and either pulley 7 or 8 is belted to the work. To decrease the speed, the belt 9 is shifted to the smaller end of the pulley 5, and simultaneously to the larger end of the pulley 4. To increase the speed, the belt is shifted to the larger end of the pulley 5, and simultaneously to the smaller end of the pulley 4. The belt is thus shifted by operating the lever 15, the lever 17 being left loose so that the belt may change its position on both pulleys. For very slow speed, the power is belted to the pulley 8$^a$, and the work to the pulley 7. For very fast speed, the power is belted to the pulley 7$^a$, and the work to the pulley 8. For stopping the power, the lever 17 is operated, and the belt 9 is thrown loose and free from the surface of the pulley 5, by moving it to its smaller end, and the belt is thrown into action by a reverse motion of the lever 17. By moving the belt to the smaller end of the cone pulley 5, it is loosened to such an extent that no motion is transmitted. When the belt is thus shifted, it is held against lateral movement intermediate its ends, by the roller 13, the frame carrying said roller being held stationary, so that the position of that portion of the belt which is traveling over the pulley 4 is not disturbed, and only that portion of the belt which is between the roller 13 and the pulley 5 is shifted by the parts carried by the lever 17. The motion may be reversed by attaching the drive belt to the pulleys 7 or 8, and the work to the pulleys 7$^a$ or 8$^a$.

What is claimed is:

1. In a transmission gearing, a pair of cone pulleys, a crossed belt connecting the same, an adjustable open frame between the pulleys through which the belt passes, a roller carried by the frame, and located between the runs of the belt at the crossing thereof, and a shifter engageable with the belt adjacent to one of the pulleys.

2. In a transmission gearing, a supporting frame, a pair of cone pulleys, a crossed belt connecting the pulleys, an adjustable open frame mounted on the supporting frame between the pulleys, and through which open frame the belt travels, a roller carried by the open frame, and located between the runs of the belt at the crossing thereof, a lever fulcrumed on the supporting frame, and a pair of rollers carried by the lever, said rollers engaging opposite edges of the belt adjacent to one of the pulleys.

3. In a transmission gearing, a pair of cone pulleys, a belt connecting the same, adjustable means between the pulleys engageable with the belt for holding the same against lateral movement at this point, and a shifter engageable with the belt between said holding means and one of the pulleys.

In testimony that I claim the foregoing as my own, I have hereto affixed my signature in the presence of two witnesses.

ABIRAM J. SLONECKER.

Witnesses:
BENTON SLONECKER,
HARRY H. ALLEN.